United States Patent Office 3,112,244
Patented Nov. 26, 1963

3,112,244
METHOD FOR CONTROLLING NEMATODES WITH PHOSPHOROTHIOITES AND PHOSPHOROTHIOATES
Lewis E. Goyette, Richmond, Va., assignor to Virginia-Carolina Chemical Corporation, Richmond, Va., a corporation of Virginia
No Drawing. Filed Apr. 21, 1961, Ser. No. 104,526
27 Claims. (Cl. 167—22)

This invention relates to a method for the control of free-living, plant-parasitic nematodes, such as the root-knot nematode. Broadly, the invention is directed to the control of nematodes by exposing them to toxic quantities of organophosphorus compounds having their carbon nuclei bound to phosphorus through a combination of oxygen and sulfur linkages.

The nematode problem was recognized abroad more than two hundred years ago, and in this country agriculturists recognized their existence at least 80 years ago. In spite of the early danger signals, the science of the control of nematodes has been greatly neglected. This is mainly because of the great difficulty in proving nematodes to be the cause of trouble in plants exhibiting poor growth. Proof requires close inspection of plant roots or isolation of the nematode from soil, and since nematodes seldom kill the plants they attack, growers are often inclined to blame poor plant growth on inadequate soil fertility or adverse weather conditions.

Losses inflicted annually by nematodes constitute a serious threat to agriculture, horticulture and forestry. While no accurate figures are available, it has been reported that losses due to nematodes in these areas amount to around 1¼ billion dollars annually. The actual figure is probably much higher than this.

Control of nematodes is difficult, and their eradication has been all but impossible. In spite of the seemingly insurmountable task the problem has nevertheless been recognized and several measures have at one time or another been taken to control them. For example, rotation of crops to control nematode populations by growing plants which are not normally parasitized by a given specie of nematode has been practiced. This, however, is impractical where monoculture prevails.

The use of chemicals for nematode control is a comparatively recent development. In view of the complex structure of the nematode, experimental approaches which could lead to effective toxicants have been difficult. The nematodes, as well as the egg thereof, is protected by a difficultly permeable membrane, and the effective toxicant must have the ability to penetrate this membrane and the ability to kill. Toxicants must also be readily dispersible in soils or other environment of the organism and be stable therein. Since the reason for ridding soils of nematode infestations is to provide a beneficial growing media for plants, the nematocide must be non-phytotoxic to plants, or its phytotoxicity must be short-lived. A phytotoxic nematocide, either itself or some decomposition product of it, should be such that, prior to crop planting, it is removed from the soil by evaporation, by rain washing, or by soil bacterial action.

Ideally, the nematocide should be such that it can, if desired, be applied to the soil while crops (crops, as used herein, is intended to mean not only food crops but also flowers, ornamentals, fruit trees, etc.) are growing, and it should have a fairly long residual life. It should not leave an objectionable residue level in the plants (or the fruit thereof) growing or to be grown in the treated soil, its mammalian toxicity should be such that the applicator is exposed to a minimum danger, and it must be amenable to conventional methods of application.

In contrast to the ideal nematocide, the most frequently used toxicants at least until fairly recently, were gaseous fumigants. Gaseous fumigants, however, are generally soil sterilants and they kill most plants, pests, etc. which they contact. Further, since fumigant nematocides are most effective only when the area to be treated is covered to prevent the loss of active ingredient, they are not practical for application to infested areas by conventional methods. They cannot, for example, be applied as a surface spray because of their volatility.

Some contact nematocides, such as the one disclosed in U.S. 2,761,806, are beginning to appear. However, it seems that extremely high concentrations of some of these contact nematocides are required for control. For example, the esters disclosed in 2,761,806 are applied at the rate of about 280 pounds per acre. This rate of application is prohibitively expensive.

It is therefore an object of this invention to provide new methods for ridding infested soil of nematodes.

It is a further object to provide groups of toxic compositions which are useful in the control of nematodes.

Another object of this invention is to provide nematocides which have a reasonable residual life and which have no herbicidal or other plant inhibitory effects at the rates necessary for nematode control.

Other objects will become apparent from the remainder of the disclosure.

In accordance with the invention, it has been found that nematodes can be controlled and the above objects satisfied with compounds from the general classes represented by the formulas $$(R'S)_2POR \qquad (I)$$

wherein R is selected from the group consisting of hydrogen, lower alkyl, substituted lower alkyl, phenyl, lower alkyl-substituted phenyl, halo-substituted phenyl, and phenyl-substituted phenyl, and R' is a lower alkyl radical, and $$(R'S)_1 \overset{X}{\underset{\|}{P}} OR \qquad (II)$$

wherein R is a member of the group consisting of hydrogen and lower alkyl radicals, R' is a lower alkyl radical and X is a member of the group consisting of oxygen and sulfur. These compounds are effective against many kinds of nematodes, such as the Meloidogyne species, other endo and acto parasitic nemas and hardy saprophytic forms such as *Panagrellus redivivus*.

Compounds of group (I) can be prepared by reacting a lower alkyl mercaptan with a phosphorodihalidite.

Specifically, S,S-dibutyl O-o-tolyl phosphorodithioite is prepared as follows:

One equivalent of o-cresol is added to about three equivalents of phosphorus trichloride while maintaining the reaction temperature at about 40° C. and the reaction vessel under a slight vacuum. After the reaction between o-cresol and phosphorus trichloride is complete, the excess trihalide and residual hydrogen chloride are removed and the desired o-tolyl phosphorodichloridite is purified by distillation. About 0.86 part of the phosphorochloridite is added to a mixture of 2 parts of butyl mercaptan, 2 parts of triethylamine and 5 parts of benzene at a temperature below 30° C. The reaction slurry is stirred at room temperature for 5–6 hours to complete the reaction, the amine hydrochloride is filtered, the benzene and excess mercaptan are removed and the product is distilled at 158–163° C. at 0.05 mm. The other phosphorodithioites disclosed herein can be prepared by the same general procedure by merely substituting the appropriate reactants and possibly modifying the reaction conditions as will be understood by one having skill in the art.

The oxygenated compounds may be prepared by following the above procedure, with minor obvious modifications, using phosphorus oxyhalides. Alternatively they may be prepared by oxidation of the appropriate phosphorodithioite.

The phosphorotrithioates are prepared by adding elemental sulfur to the appropriate phosphorodithioite and purifying by distillation if necessary.

The phosphorus organic compounds of the invention are useful for the control of nematodes when applied at the rate of between about 16 and 62 pounds of the active ingredient per acre. The compounds may be applied to the soil in the form of sprays or injections or they may be applied with a vehicle or extender. For example, they may be mixed with soil, saw dust, sand, clay, or any convenient carrier which will aid in the uniform distribution of the chemical over the ground. As a general rule, solid carriers which are acceptable are those which are non-hygroscopic, thereby preventing the compositions from caking. In addition to soil, saw dust, etc. samples of suitable solid carriers are kaolinite, bentonite, attapulgite, etc.

Liquid compositions for nematocidal uses may be solutions or liquid dispersions or emulsions. The liquid medium used will depend largely upon the physical and chemical nature of the active ingredient. If the compound is water soluble, water alone will suffice as the carrier. Where the active ingredient is insoluble in water, or substantially so, it is desirable to add a small amount of an inert, non-phytotoxic organic solvent which can be readily dispersed in the aqueous medium to produce a heterogeneous dispersion of the active component.

A useful liquid nematocidal formulation is one containing a surface active agent which aids in the uniform distribution of the formulation in the soil. An effective liquid formulation may include the active component, acetone, water and a surface active agent such as polyoxyethylene sorbitan monolaurate. Among other wetting agents or emulsifiers which are useful are a blend of polyoxyethylene sorbitol esters of mixed fatty and resin acids and alkyl aryl sulfonates and a blend of polyoxyethylene sorbitan esters of fatty and resin acids and alkyl aryl sulfonates. The three above-named agents are sold by Atlas Powder Company under the names Tween-20, Atlox G-3396, and Atlox G-2081, respectively. The solution or dispersion is conveniently sprayed or poured evenly over the area to be treated and is washed in with water. Mixtures of the nematocides with solid carriers may be distributed over the soil in any convenient manner and then mixed with the soil by plowing, disking, etc. Liquid applications can also be plowed or disked into the soil or they may be left to the action of natural rainfall. In any event, it is essential that the material be dispersed below ground. Normally a depth of 2-8 inches will be required if good control of nematode infestations is to be achieved.

Application of the chemicals of this invention to food-crop land prior to planting is preferable, one reason being that it is less difficult to treat a field wherein no crops are growing. Prior treatment can in no way reduce the length of the growing season, for, as pointed out above, the chemicals are not phytotoxic when used in nematocidal amounts. Crops can, therefore, be planted immediately after treatment, if desired. This is very important, especially in some zones wherein the growing season is relatively short and any method for nematode control which tends to shorten the growing season cannot be tolerated.

The following will illustrate the efficaciousness of the chemicals of this invention as nematocides. The description of the methods used and the examples of the tables are merely illustrative, and they must not be construed as limitations on the scope of the invention. The scope will include equivalent compounds and methods for applying them which accomplish the results of this disclosure.

The nematocidal activity of the compounds presented in the tables below was determined in a number of ways. The descriptions below will illustrate the methods employed.

RAPID FUMIGANT TEST

Four BPI watch glasses were placed in a Petri dish; one drop of *Panagrellus redivivus* culture and six drops of distilled water were added to each dish. A fifth BPI watch glass containing about 20 mg. of the test compound was placed in the center of the dish, the dish was covered to prevent escape of chemical, and results were taken 24 hours later. The results are expressed as a letter based on a scale on which A=no nematodes alive and E=100% of the nematodes alive, the points between (B, C, D) being arbitrarily assigned. No attempt has been made to assign a definite percentage to the middle letters, because different operators may select different percentages to designate B, C and D.

SOIL BARRIER TEST 160 mg. samples of the test compounds were placed in the bottom of 32 x 600 mm. test tubes. A cotton plug was placed about one inch above the compound and this was followed by 50 gm. of soil infested with nematodes (Meloidogyne sp.). A small shell vial containing three drops of nematode culture (*Panagrellus redivivus*) and seven drops of distilled water was placed upright in the soil sample. The test tubes were tightly stoppered for 48 hours, after which three methods of evaluation were employed as follows:

(1) The vial containing the Panagrellus was examined for nematodes and rated according to the method given for rating the results of the Rapid Fumigant Test.

(2) One tablespoon of the infested soil was placed in a Baermann funnel and checked for nematodes according to a standard technique (48 hour funnel extraction). Rating was from A to E, based on the number of nematodes counted, i.e. A=none, E=approximately the number of nematodes found in the untreated control. As in other tests where nematodes are to be counted, B, C and D ratings were arbitrarily assigned.

(3) The remainder of the soil sample was mixed with sterile soil. The soil thus obtained was placed in pots and tomato seedlings grown in non-infested soil were placed therein. One month later, the roots were examined and a root-knot index was obtained, evaluation being on the following scale.

No. knots/2 gm. of roots:
```
0 _____ A
1-10 _____ B
11-20 _____ C
21-30 _____ D
31 and above_____ E
```

All three tests were run in triplicate.

The letter values given in the following table under this heading are averages of the tests described in (1), (2) and (3).

SOIL FUMIGANT TEST

A two-inch Pyrex tube, twelve inches long was filled as follows:

A one-inch cotton plug was placed in one end. Four inches of soil (about 250 cc.) infested with parasitic and saprophytic nematodes was placed on top of the cotton plug. A ten-ml. beaker containing 1 ml. of the active compound was ⅔ imbedded in the soil and a two-inch section of screen placed in the tube so that it rested on the top of the beaker. A one-inch cotton plug was placed on the screen, four inches of infested soil was packed into the tube on the second cotton plug, and a final cotton plug placed in the top. During the test, the tube was supported in an upright position so that none of the compound was spilled.

Seven days after the test was begun, the soil plugs were removed and each was divided into three parts so that 6 zones were established, said zones running consecutively from top to bottom. Two level tablespoonfuls of soil were taken from each area and placed in separate Baermann funnels (for duplicate results). After 48 hours samples were drawn off and the number of nematodes per pint of soil from each area was calculated. Each result given is the average of the two tests per zone and are based on the scale A=no nematodes counted, E=approximately the same number of nematodes as in the untreated control.

CONTACT POT TEST

Sterile test soil was infested by mixing it with soil in which root knot-infested tomato plants had grown for three months. Enough soil to fill three four-inch pots was removed and placed in a metal tray and was mixed with 75 mg., 38 mg. or 19 mg. of the test compound (corresponding to about 62, 32 or 16 pounds per acre), 50 mg. of Tween-20 emulsifier and 126 ml. of water (for solids use 12 ml. of acetone or other non-phytotoxic solvent and 114 ml. of water).

The soil was re-potted and placed in a sand bench for two weeks, and it received normal greenhouse watering during this period. At the end of this period a tomato seedling (three weeks old) was transplanted to each pot. It was allowed to grow for 35 days. At the end of this period the plant was uprooted and two grams of the roots were cut away. The root knots were counted and rated according to the following scale.

No. of knots/2 gms. of roots:
```
0 ------------------------------------------- A
1–10 ---------------------------------------- B
11–20 --------------------------------------- C
21–30 --------------------------------------- D
31 or above --------------------------------- E
```

The results are average of three replicates at each concentration.

*Table 1*

COMPOUNDS OF TYPE ROP(SR')₂

| Compound | Rapid Fumigant | Soil Barrier | Soil Fumigant | Contact, lb./acre | | |
|---|---|---|---|---|---|---|
| | | | | 62 | 32 | 16 |
| (CH₃S)₂P O C₂H₅ | A | B | | | | |
| (CH₃S)₂P O C₃H₇ | A | A | | | | |
| (C₂H₅S)₂P O CH₃ | A | | A | A | | |
| (C₂H₅S)₂P O C₂H₅ | A | B | A | A | A | A |
| (C₂H₅S)₂P O C₃H₇ | A | | A | C | | |
| (C₂H₅S)₂P O C₄H₇ | A | | A | | | |
| (C₂H₅S)₂P O CH₂CHClCH₂ | A | | | | | |
| (C₂H₅S)₂P O C₆H₄C(CH₃)₃ | | | | B | | |
| (C₂H₅S)₂P O C₆H₄CH₃ (o) | | | A | A | A | |
| (C₂H₅S)₂P O C₆H₄CH₃ (m) | A | | A | A | B | B |
| (C₂H₅S)₂P O C₆H₄CH₃ (p) | | | | A | | |
| (C₃H₇S)₂P O CH₃ | C | | | | A | |
| (C₃H₇S)₂P O C₂H₅ | | | | | A | |
| (C₃H₇S)₂P O C₃H₇ | | | | A | A | A |
| (C₃H₇S)₂P O C₄H₉ | | | | A | | |
| (C₃H₇S)₂P O CH₂CH₂Cl | | | | A | A | A |
| (C₃H₇S)₂P O C₆H₄CH₃ (m,p) | A | | | | A | |
| (C₃H₇S)₂P O C₆H₄C₆H₅ | | | | A | | |
| (C₃H₇S)₂P O C₆H₃Cl₂ | | | | | A | |
| (C₃H₇S)₂P O C₆H₄Cl | | | | A | A | B |
| (C₄H₉S)₂P O CH₃ | | | C | C | | |
| (C₄H₉S)₂P O C₂H₅ | | | A | A | A | B |
| (C₄H₉S)₂P O C₃H₇ | | | | A | | |
| (C₄H₉S)₂P O C₄H₉ | | | | A | | |
| (C₄H₉S)₂P OH | A | A | | A | | |
| (C₄H₉S)₂P O C₆H₄CH₃ | | | C | A | | |

Table I—Continued

| Compound | Rapid Fumigant | Soil Barrier | Soil Fumigant | Contact, lb./acre | | |
|---|---|---|---|---|---|---|
| | | | | 62 | 32 | 16 |
| $(C_4H_9S)_2PO$-(p-CH$_3$-C$_6$H$_4$) | A | | B | | | |
| $(C_4H_9S)_2PO$-(2,3,4,5-tetrachlorophenyl) | | | | A | | |
| $(C_3H_7S)(C_4H_9S)PO$-(p-CH$_3$-C$_6$H$_4$) | | | | A | | |
| $(C_3H_7S)(C_4H_9S)PO$-(o-CH$_3$-C$_6$H$_4$) | A | A | | C | | |
| $(C_3H_7S)(C_4H_9S)PO$-C$_6$H$_4$-CH$_3$ | A | A | | B | | |
| $(C_3H_7S)(C_4H_9S)PO$-C$_6$H$_5$ | | | | A | | |

Table II
COMPOUNDS OF THE TYPE

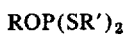
$$\text{ROP(SR')}_2 \text{ with } X$$

| Compound | Contact, lb./acre | | |
|---|---|---|---|
| | 62 | 32 | 16 |
| $(CH_3S)_2P(S)OC_2H_5$ | | A | A |
| $(C_2H_5S)_2P(S)OC_2H_5$ | A | A | B |
| $(C_2H_5S)_2P(O)OC_2H_5$ | | A | |
| $(C_3H_7S)_2P(O)OC_3H_7$ | A | | |
| $(C_3H_7S)_2P(S)OC_3H_7$ | B | C | |
| $(C_3H_7S)_2P(S)OC_4H_9$ | A | | |
| $(C_3H_7S)_2P(O)OCH_3$ | A | C | |
| $(C_3H_7S)_2P(O)OC_2H_5$ | A | A | |
| $(C_4H_9S)_2P(O)OC_2H_5$ | A | | B |
| $(C_4H_9S)_2P(O)OC_3H_7$ | A | | |
| $(C_4H_9S)P(O)OC_4H_9$ | A | | |
| $(C_4H_9S)_2P(O)OH$ | A | | |

The discovery of the nematocidal properties of the compounds disclosed herein was not obvious from the prior art because there is no known correlation between the structure of a chemical compound and its probability of being a nematocide, or even between the probability of an insecticide having nematocidal properties. Nematodes are not insects and are not classed as such by the U.S. Department of Agriculture. The U.S. Department of Agriculture recognizes the differences, and separate laws have been passed to cover the sale and use of insecticides and nematocides.

The term "soil" as used in this disclosure is meant to include all conventional "soils" as stated in Webster's New International Dictionary, Second Edition, Unabridged, published in 1954 by G. and C. Merriam Company, Springfield, Massachusetts. The term is meant to include any substance or medium in which vegetative organisms may take root and grow. The term includes not only earth, but also any manure, mulch, compost, etc. which can support plant life.

Having described the invention, what is claimed is:

1. A method for the control of soil-borne nematodes which comprises contacting said soil with a nematocidal amount of a compound of the formula $$\text{ROP(SR')}_2$$

wherein R is selected from the group consisting of hydrogen, lower alkyl, halo-substituted lower alkyl, phenyl, lower alkyl-substituted phenyl, halo-substituted phenyl and phenyl-substituted phenyl and R' is a lower alkyl radical.

2. A method according to claim 1 in which the compound is S,S-diethyl o-ethyl phosphorodithioite.
3. A method according to claim 1 in which the compound is S,S-diethyl O-o-tolyl phosphorodithioite.
4. A method according to claim 1 in which the compound is S,S-diethyl O-m-tolyl phosphorodithioite.
5. A method according to claim 1 in which the compound is S,S-dipropyl O-propyl phosphorodithioite.
6. A method according to claim 1 in which the compound is S,S-dibutyl O-ethyl phosphorodithioite.
7. A method according to claim 1 in which the compound is S,S-diethyl O-methyl phosphorodithioite.
8. A method according to claim 1 in which the compound is S,S-dipropyl O-methyl phosphorodithioite.
9. A method according to claim 1 in which the compound is S,S-dipropyl O-ethyl phosphorodithioite.
10. A method according to claim 1 in which the compound is S,S-dipropyl O-2-chloroethyl phosphorodithioite.
11. A method according to claim 1 in which the compound is S,S-dipropyl O-m,p-tolyl phosphorodithioite.
12. A method according to claim 1 in which the compound is S,S-dipropyl O-2,4-dichlorophenyl phosphorodithioite.
13. A method according to claim 1 in which the compound is S,S-dipropyl O-p-chlorophenyl phosphorodithioite.
14. A method according to claim 1 in which the compound is S,S-dibutyl O-propyl phosphorodithioite.
15. A method according to claim 1 in which the compound is S,S-dibutyl O-butyl phosphorodithioite.
16. A method according to claim 1 in which the compound is S-propyl S-butyl O-tolyl phosphorodithioite.
17. A method for the control of soil-borne nematodes which comprises contacting said soil with a nematocidal amount of a compound of the formula

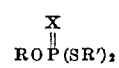
$$\text{ROP(SR')}_2$$

wherein R is a member of the group consisting of hydrogen and lower alkyl radicals, R' is a lower alkyl radical and X is a member of the group consisting of oxygen and sulfur.

18. A method as defined in claim 17 in which the compound is S,S-dimethyl O-ethyl phosphorotrithioate.

19. A method as defined in claim 17 in which the compound is S,S-diethyl O-ethyl phosphorotrithioate.

20. A method as defined in claim 17 in which the compound is S,S-diethyl O-ethyl phosphorodithioate.

21. A method as defined in claim 17 in which the compound is S,S-dibutyl O-ethyl phosphorodithioate.

22. A method as defined in claim 17 in which the compound is S,S-dibutyl O-butyl phosphorodithioate.

23. A method as defined in claim 17 in which the compound is S,S-dipropyl O-propyl phosphorodithioate.

24. A method as defined in claim 17 in which the compound is S,S-dipropyl O-propyl phosphorotrithioate.

25. A method as defined in claim 17 in which the compound is S,S-dipropyl O-butyl phosphorotrithioate.

26. A method as defined in claim 17 in which the compound is S,S-dibutyl O-methyl phosphorodithioate.

27. A method as defined in claim 17 in which the compound is S,S-dibutyl O-propyl phosphorodithioate.

References Cited in the file of this patent

UNITED STATES PATENTS

| | | |
|---|---|---|
| 2,761,806 | Boyer | Sept. 4, 1956 |
| 2,856,426 | Estabrook | Oct. 14, 1958 |
| 2,861,912 | Sallman | Nov. 25, 1958 |
| 2,867,561 | Scott | Jan. 6, 1959 |
| 2,928,864 | Tabor | Mar. 15, 1960 |
| 2,955,803 | Goyette | Oct. 11, 1960 |

OTHER REFERENCES

Kosolapoff: John Wiley and Sons, Inc., London, 1950, page 258.

UNITED STATES PATENT OFFICE
CERTIFICATE OF CORRECTION

Patent No. 3,112,244            November 26, 1963

Lewis E. Goyette

It is hereby certified that error appears in the above numbered patent requiring correction and that the said Letters Patent should read as corrected below.

Column 1, line 49, for "nematodes" read -- nematode --; column 2, line 47, for "acto" read -- ecto --; columns 5 and 6, Table I, first column, the seventh compound should appear as shown below instead of as in the patent:

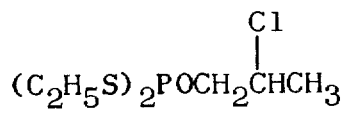

column 7, Table II, first column, the tenth formula should appear as shown below instead of as in the patent:

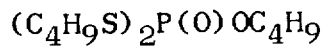

Signed and sealed this 12th day of May 1964.

(SEAL)
Attest:

ERNEST W. SWIDER            EDWARD J. BRENNER
Attesting Officer            Commissioner of Patents